(12) United States Patent
Deja et al.

(10) Patent No.: US 11,536,156 B2
(45) Date of Patent: Dec. 27, 2022

(54) DEVICE AND ASSEMBLY FOR CLEANING THE CORE ENGINE OF A JET ENGINE

(71) Applicant: Lufthansa Technik AG, Hamburg (DE)

(72) Inventors: Dirk Deja, Nauheim (DE); Christian Lutz, Aschaffenburg (DE); Marc Hacker, Frankfurt am Main (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/265,813

(22) PCT Filed: Aug. 1, 2019

(86) PCT No.: PCT/EP2019/070741
§ 371 (c)(1),
(2) Date: Feb. 4, 2021

(87) PCT Pub. No.: WO2020/030514
PCT Pub. Date: Feb. 13, 2020

(65) Prior Publication Data
US 2021/0164360 A1 Jun. 3, 2021

(30) Foreign Application Priority Data
Aug. 6, 2018 (DE) ..................... 10 2018 119 092.1

(51) Int. Cl.
*F01D 25/00* (2006.01)
*B08B 3/02* (2006.01)
(Continued)

(52) U.S. Cl.
CPC .......... *F01D 25/002* (2013.01); *B05B 15/652* (2018.02); *B08B 3/022* (2013.01);
(Continued)

(58) Field of Classification Search
CPC ........ B64F 5/30; B05B 15/652; F01D 25/002; B08B 3/024; B08B 3/02; B08B 3/022;
(Continued)

(56) References Cited

U.S. PATENT DOCUMENTS 5,868,860 A 2/1999 Asplund
7,445,677 B1 11/2008 Asplund
(Continued)

FOREIGN PATENT DOCUMENTS

DE 102008021746 A1 11/2009
DE 202013005524 U1 5/2014
(Continued)

OTHER PUBLICATIONS

Machine Translation of DE 202013005524 to Lufthansa, May 2014. (Year: 2014).*

*Primary Examiner* — Benjamin L Osterhout
(74) *Attorney, Agent, or Firm* — Leydig, Voit & Mayer, Ltd.

(57) ABSTRACT

A device cleans a core engine of a jet engine. The device has: a nozzle installation configured to introduce a cleaning medium into the core engine; a connector configured to connect the device in a rotationally fixed manner to a shaft of a fan of the jet engine; and a line connection configured to supply the cleaning medium, the line connection being connected to the nozzle installation by a rotary coupling. The nozzle installation has first contact faces configured to bear axially on fan blades of the fan, the first contact faces being configured for defined positioning of the nozzle installation relative to the jet engine.

14 Claims, 4 Drawing Sheets

(51) Int. Cl.
  *B08B 13/00*      (2006.01)
  *B05B 15/652*     (2018.01)
(52) U.S. Cl.
  CPC .............. *B08B 3/024* (2013.01); *B08B 13/00* (2013.01); *F05D 2220/30* (2013.01); *F05D 2230/72* (2013.01)
(58) Field of Classification Search
  CPC .. B08B 13/00; F05D 2220/30; F05D 2230/72
  See application file for complete search history.

(56) References Cited

U.S. PATENT DOCUMENTS

| | | | | |
|---|---|---|---|---|
| 7,497,220 B2* | 3/2009 | Asplund | ................... | B08B 3/02 |
| | | | | 134/32 |
| 8,919,699 B2* | 12/2014 | Kress | ...................... | B64C 1/143 |
| | | | | 244/129.4 |
| 2003/0209256 A1* | 11/2003 | Tadayon | ................ | B08B 17/00 |
| | | | | 134/10 |
| 2006/0048796 A1* | 3/2006 | Asplund | ................... | F02K 3/06 |
| | | | | 134/21 |
| 2008/0040872 A1* | 2/2008 | Hjerpe | ................. | F01D 25/002 |
| | | | | 15/3 |
| 2008/0087301 A1* | 4/2008 | Lee | ........................... | B08B 9/00 |
| | | | | 134/198 |
| 2008/0178909 A1* | 7/2008 | Alvestig | ................... | B08B 3/14 |
| | | | | 134/44 |
| 2010/0000572 A1* | 1/2010 | Giljohann | .............. | B24C 1/003 |
| | | | | 134/198 |
| 2014/0034091 A1 | 2/2014 | Dorshimer et al. | | |
| 2017/0204739 A1* | 7/2017 | Rawson | ................... | B08B 5/02 |

FOREIGN PATENT DOCUMENTS

| | | |
|---|---|---|
| DE | 102013202616 A1 | 8/2014 |
| WO | WO 2005077554 A1 | 8/2005 |
| WO | WO 2008113501 A1 | 9/2008 |

* cited by examiner

DEVICE AND ASSEMBLY FOR CLEANING THE CORE ENGINE OF A JET ENGINE

CROSS-REFERENCE TO PRIOR APPLICATIONS

This application is a U.S. National Phase Application under 35 U.S.C. § 371 of International Application No. PCT/EP2019/070741, filed on Aug. 1, 2019, and claims benefit to German Patent Application No. DE 10 2018 119 092.1, filed on Aug. 6, 2018. The International Application was published in German on Feb. 13, 2020 as WO 2020/030514 under PCT Article 21(2).

FIELD

The present invention relates to a device for cleaning the core engine of the jet engine.

The present invention furthermore relates to an assembly of such a device and a jet engine.

BACKGROUND

Jet engines of commercial sub-sonic airliners nowadays are largely turbofan jet engines. Such a turbofan jet engine possesses a core engine in which the actual combustion process of the kerosene takes place. The core engine possesses one or more compressor stages, a combustion chamber, as well as one or more turbine stages in which the hot combustion gases discharge part of their mechanical energy. This mechanical energy is required for driving the compressor stages, on the one hand, and a turbofan which is disposed upstream of the core engine and typically has a significantly larger diameter than the core engine and allows a significant part of the overall air flowing through the engine to flow past the engine as a bypass airflow or a secondary airflow, on the other hand. By way of this bypass air flow, the turbofan generates a significant part of the thrust output of the engine; the high proportion of bypass airflow furthermore ensures a better environmental compatibility of the engine, in particular a better rate of efficiency at sub-sonic speeds, as well as an improved noise abatement of the hot exhaust flow of the core engine.

Jet engines, when in operation, are contaminated by combustion residue of the core engine as well as by air contamination that has been suctioned by the combustion or bypass air, respectively, such as, for example, dust, insects, salt spray, or other environmental contaminations. These contaminations form a layer, in particular also on the rotor blades and/or stator blades of the compressor of the core engine that impedes the surface quality and thus ultimately the thermodynamic efficiency of the engine.

Jet engines are cleaned in order for the contaminations to be removed. For this purpose, it is known from WO 2005/077554 A1 to dispose a plurality of cleaning nozzles upstream of the fan of a turbofan engine so as to clean the fan and the core engine.

WO 2008/113501 A1 discloses a device of the type mentioned at the outset which is placed onto the fan and conjointly rotates during the cleaning operation.

SUMMARY

In an embodiment, the present invention provides a device that cleans a core engine of a jet engine. The device has: a nozzle installation configured to introduce a cleaning medium into the core engine; a connector configured to connect the device in a rotationally fixed manner to a shaft of a fan of the jet engine; and a line connection configured to supply the cleaning medium, the line connection being connected to the nozzle installation by a rotary coupling. The nozzle installation has first contact faces configured to bear axially on fan blades of the fan, the first contact faces being configured for defined positioning of the nozzle installation relative to the jet engine.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
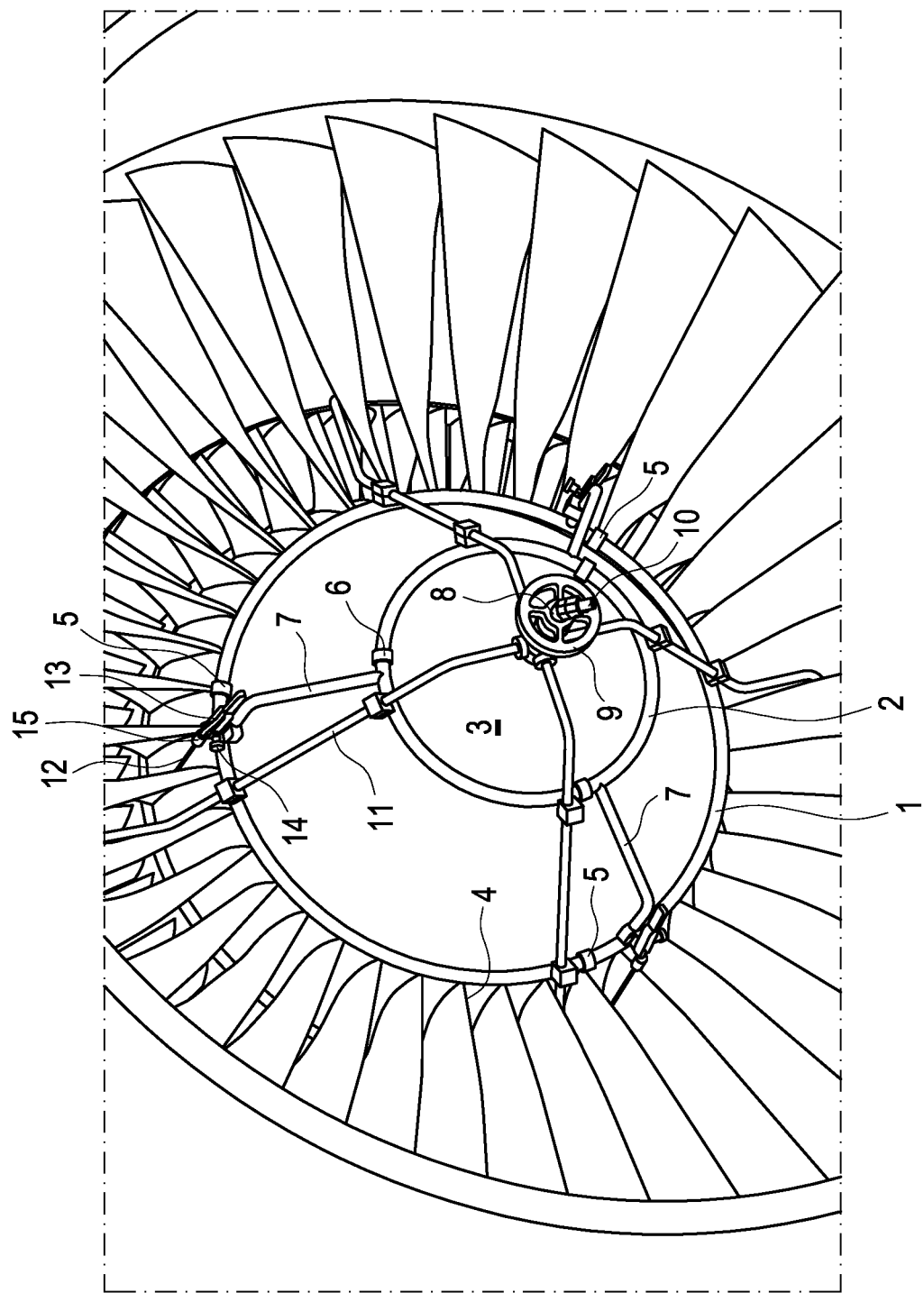
FIG. 1: schematically shows a view of a device according to the invention that is assembled on a jet engine.
Figure 2:
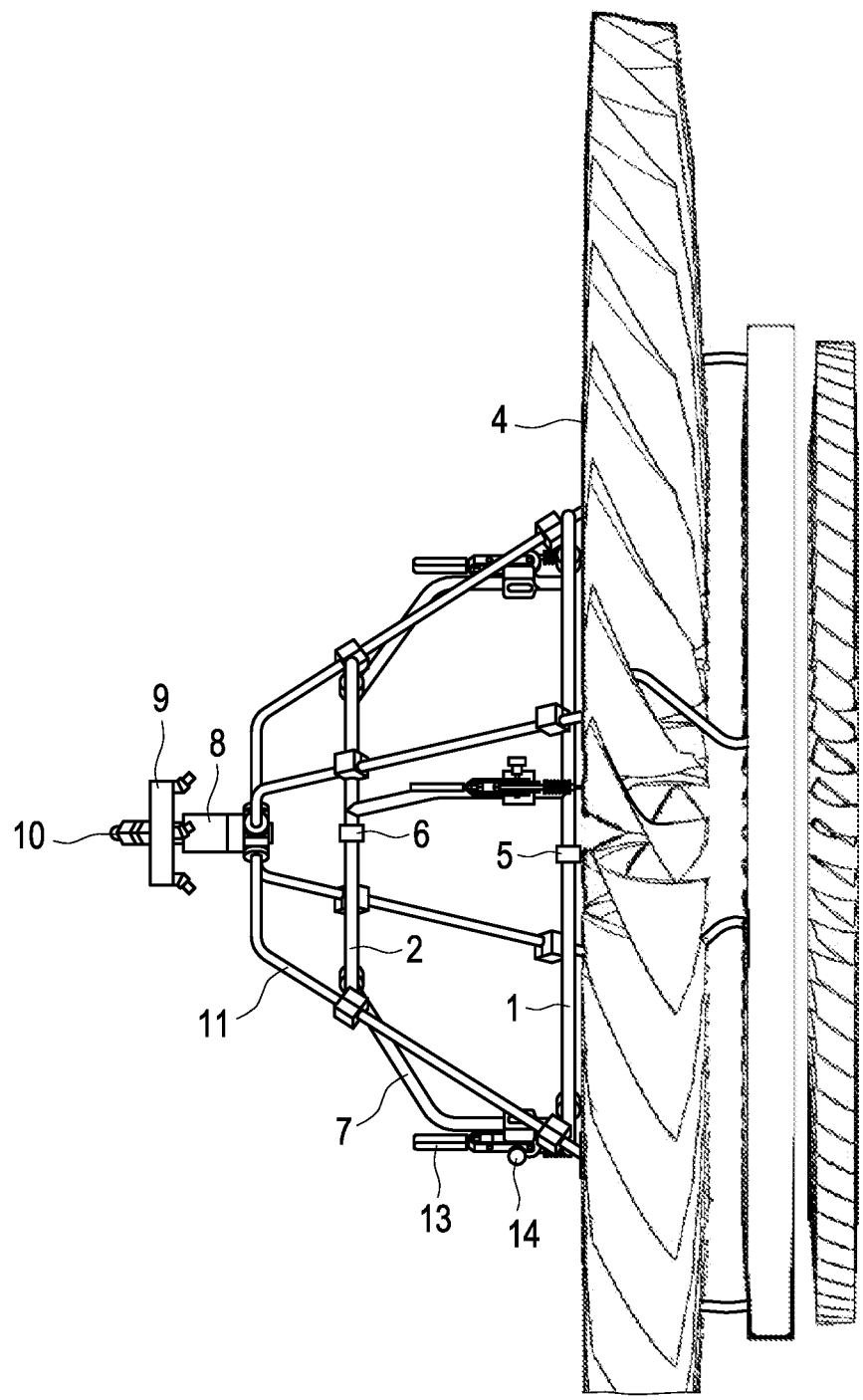
FIG. 2: schematically shows an axial section through the engine having a device according to the invention placed thereon.
Figure 3:
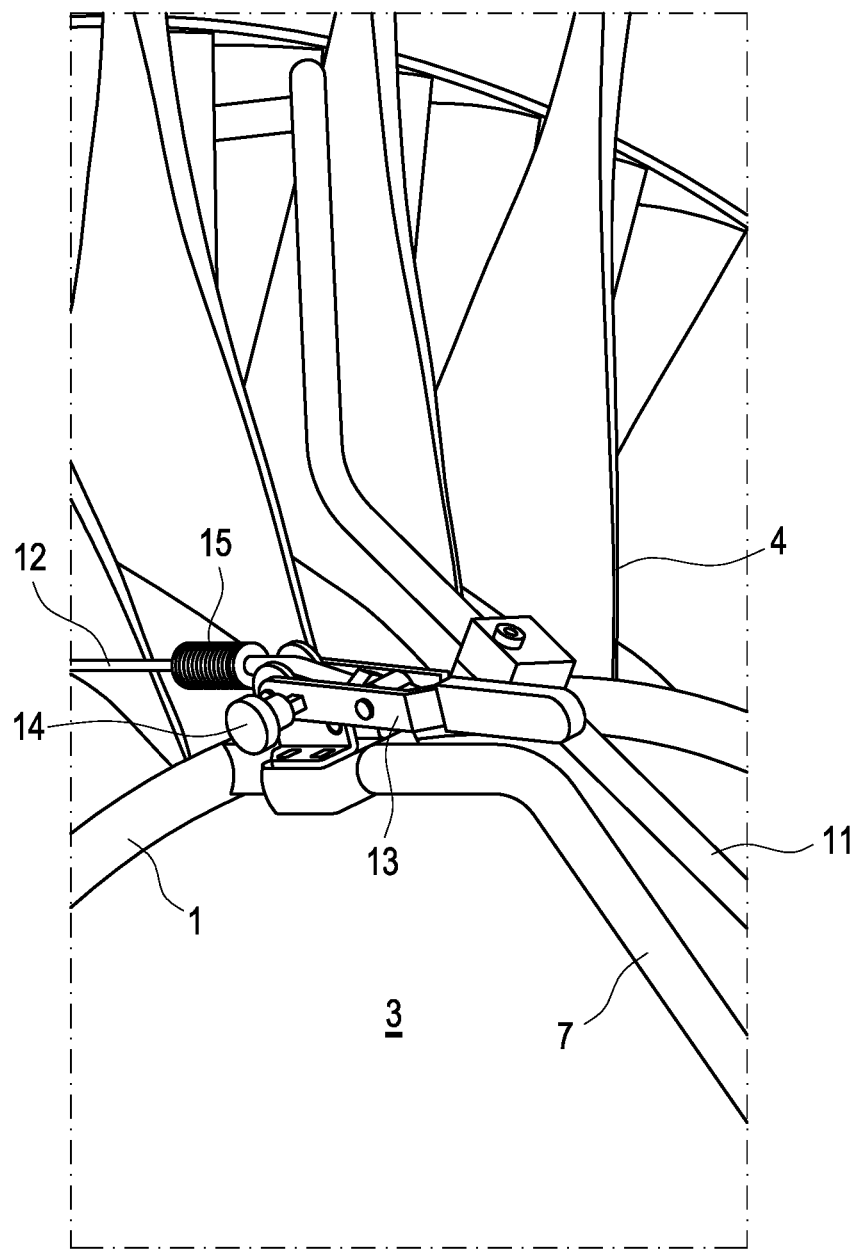
FIG. 3: shows the fastening by means of a bell crank lever in a detailed view.
Figure 4:
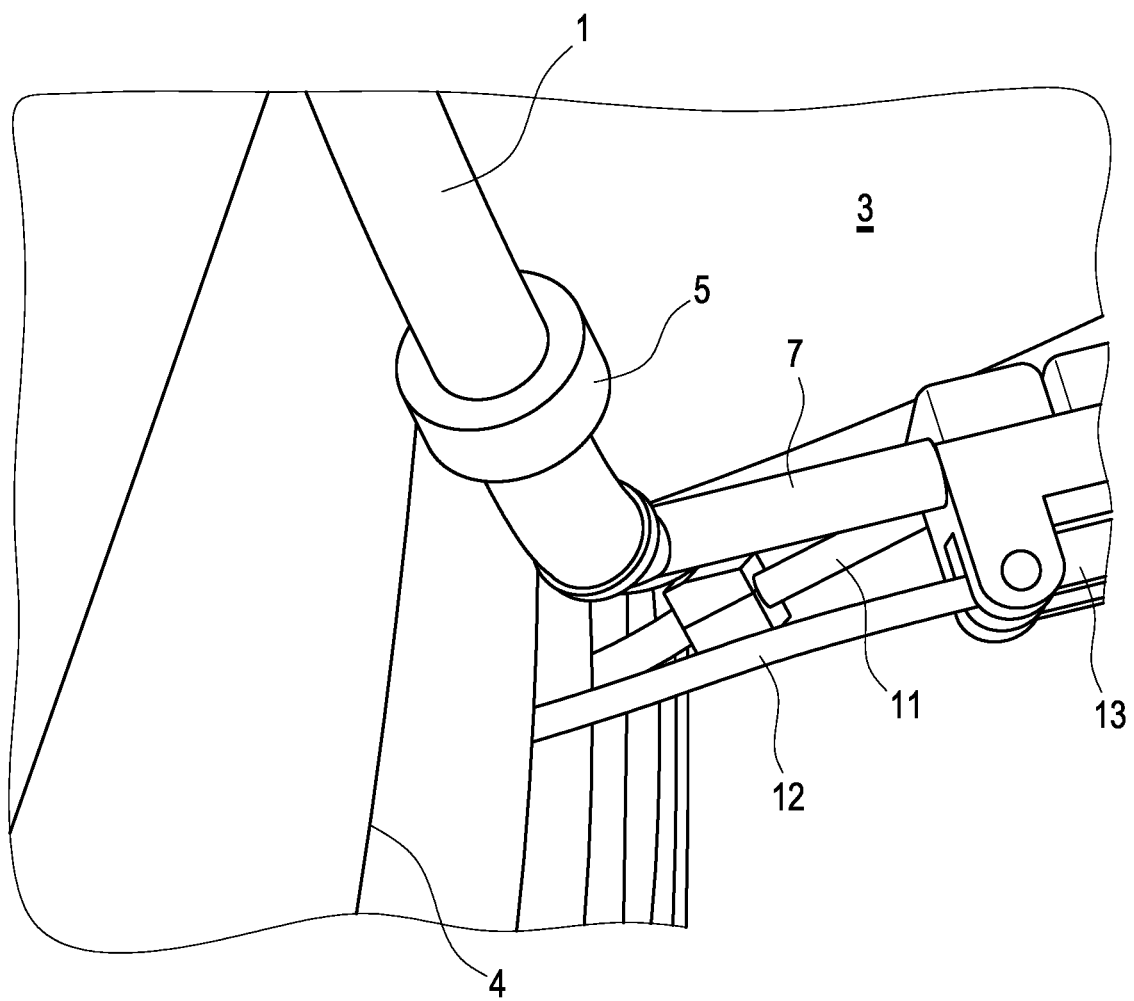
FIG. 4: shows the design embodiment of the first contact faces in a detailed view.

In an embodiment, the present invention provides a device and assembly of the type mentioned at the outset which has advantages in terms of handling and operation.

In an embodiment according to the invention, a nozzle installation has first contact faces for bearing axially on the fan blades, which contact faces are configured for defined positioning of the nozzle installation relative to the jet engine.

A further embodiment of the invention relates to an assembly of a jet engine and a device according to an embodiment of the invention attached thereto for performing cleaning of the core engine, the assembly having the features:

a. the nozzle installation is connected in a rotationally fixed manner to the shaft of the fan of the jet engine;
b. the rotation axes of the fan of the jet engine and of the nozzle installation are disposed so as to be substantially concentric;
c. the nozzles of the nozzle installation have a radial spacing from the common rotation axis of the jet engine and the device that is smaller than the radius of the entry opening of the core engine;
d. the exit openings of the nozzles in the axial direction are disposed behind the plane of the fan, and/or the nozzles are disposed in intermediate spaces of the fan blades or aligned toward intermediate spaces of the fan blades such that the nozzle jets can pass through the plane of the fan in a substantially unimpeded manner;
i.
   characterized by the features:
e. the first contact faces of the nozzle installation bear on fan blades of the jet engine and cause defined axial positioning of the nozzle installation relative to the jet engine.

Some of the terms used in the context of the application are first to be explained. The term jet engine refers to any mobile gas turbines for application in the aerospace sector. In the context of the application, the term refers in particular to turbofan engines in which the actual gas turbine forms a so-called core engine, and in which a turbofan which, in terms of the diameter, is larger and generates a bypass airflow about the core engine is disposed upstream of the core engine. The term core engine refers to the actual gas turbine of the jet engine in which the combustion process of the fuel, in particular kerosene, takes place. Such a core engine typically has one or more compressor stages, a combustion chamber, as well as one or more turbine stages which are driven by the hot exhaust gases.

The nozzle installation has one or a plurality of nozzles for the cleaning medium as well as means for connecting in a rotationally fixed manner this nozzle installation and thus the nozzles to the shaft of the fan of the jet engine, the means being explained in more detail hereunder.

The cleaning medium is supplied to the nozzle installation by means of a line connection and a rotary coupling. The term line connection in the context of the application is to be widely interpreted and can also comprise the stationary (not conjointly rotating) connector piece on the rotary coupling, for example.

A supply installation may provide a cleaning medium (for example in one or a more tanks), and can be provided with operating and drive installations, pumps, power accumulators, or the like. The supply installation is preferably configured as a mobile, in particular drivable, unit.

The nozzle installation has first contact faces for bearing axially on the fan blades. When placing the nozzle installation onto the spinner of the jet engine, these defined first contact faces form a detent, which positions in a defined manner the nozzle installation relative to the jet engine at least in the axial direction. When being placed thereon, these first contact faces come to bear on fan blades in the axial direction and thus stop the placement movement. The nozzle installation is subsequently fastened to the fan blades, as is explained in more detail hereunder; the means for connecting in a rotationally fixed manner herein apply forces (tensile forces) acting in the axial direction in such a manner that the defined axial positioning in the cleaning operation is maintained on account of contact on the fan blades.

The first contact faces are preferably configured so as to be cushioned and/or elastic, for example as rubber buffers. These are a plurality of contact faces, preferably three or more contact faces, which are preferably distributed across the circumference at uniform angular spacings. The extent of the contact faces in the radial direction as well as the circumferential direction is preferably sufficient so as to cause secure positioning and absorption of forces of the nozzle installation placed thereon.

The invention has recognized that the positioning of the nozzle installation in the prior art according to WO 2008/113501 A1 only by contacting or bearing, respectively, on the spinner typically leads to the nozzle installation being positioned in a non-defined and/or eccentric manner relative to the jet engine. This causes an unbalance and/or high wear on the rotary coupling in the cleaning operation. In contrast, the axial contact, on the fan blades, provided according to embodiments of the present invention permits defined positioning, which ensures that the axis of the nozzle installation (and thus of the rotary coupling) always runs in the same direction as the axis of the jet engine.

The first contact faces are preferably disposed on a first annular region of the nozzle installation. This annular region can preferably be configured as a closed ring, which is disposed on the end region of the nozzle installation that, in the placed state, points downstream. According to embodiments of the invention, the face of this annular region that, in the axial direction, points downstream can be configured as a (cushioned) first contact face across the entire circumference or across sub-segments of the circumference.

In the assembly according to an embodiment of the invention, the internal diameter of the first annular region is preferably identical to or slightly larger than the external diameter of the spinner (the external diameter in the axial plane in which the front edges of the fan blades lie). This contributes towards precisely positioning the nozzle installation not only axially but also radially in relation to the jet engine. Slightly larger in this context means that the first annular region in relation to the jet engine in the placed state has radial play only such that the desired centric fit, if at all, is only slightly compromised.

In one advantageous embodiment, the nozzle installation additionally has second contact faces for bearing on the spinner of the jet engine. The second contact faces can be disposed on a second annular region of the nozzle installation, for example, that in the axial direction is disposed between the first annular region and the rotary coupling. These second contact faces can likewise be elastic/cushioned. The second contact faces can preferably contribute toward centering the nozzle installation placed on the jet engine in a radial plane between the upstream-facing tip of the spinner and the front edge of the fan blades.

Overall, the first and the second contact faces conjointly can thus be configured for centering the device on the spinner of the jet engine.

In the device according to an embodiment of the invention, in the placed state, as well as in the assembly according to the invention, the distribution of mass of the nozzle installation is preferably rotationally symmetrical about the rotation axis of the latter.

In one particularly preferred embodiment of the invention, the means for connecting in a rotationally fixed manner to the shaft of the fan of the jet engine comprise at least two, preferably three or more tensioning ropes and fastening means for fastening the tensioning ropes to the fan blades. The fastening means are configured as individual fastening means that can be separately locked. The distribution of the fastening means and/or tensioning ropes in the circumferential direction can correspond to the respective distribution of the first contact faces, or in the circumferential direction can be disposed between such contact faces.

The tensioning ropes are preferably able to be fastened to the fan blades, preferably to the rear edge of the latter (by means of hooks or clamping jaws). These hooks or clamping jaws, respectively, can have a sufficiently soft plastics-material or rubber coating or casing.

A design embodiment according to the invention of the fastening means as separately lockable individual fastening means has substantial advantages in comparison to the central clamping device disclosed in WO 2008/113501 A1. In this prior art, the tensioning ropes have to be deflected and guided up to the rotary coupling in a complicated manner; a central clamping ring by way of which all tensioning ropes are simultaneously tensioned and a comparatively imprecise positioning of the nozzle installation is thus caused is provided in the prior art.

The contact faces provided according to an embodiment of the invention and the positioning of the nozzle installation caused on account thereof permit individual fastening means, which are substantially easier to handle and which can be fastened and locked in a sequential manner to be provided, because the positioning is already insured on account of the contact faces. The individual fastening moreover permits short tensioning ropes, and thus, a simple and robust clamping system.

The individual fastening means preferably have bell crank levers for locking and tensioning the tensioning ropes. In the case of a bell crank lever, the transmission ratio between the applied force and the resultant force, or between the primary throw and the secondary throw, respectively, varies continuously during the activation. During the activation to the closed (locked) state, the throw rate (exerted on the tensioning rope) is reduced at a constant activation rate, while, in contrast, the tensile force exerted on the tensioning rope is increased.

This design embodiment according to the invention of the individual fastening means permits the nozzle installation to be fastened to a jet engine in a simple, secure and defined manner without the aid of tools.

The individual fastening means preferably have spring elements for setting a predefined preload of the tensioning ropes in order for the nozzle installation to be compressed by way of a defined force.

It can be provided according to the invention that the individual fastening means, for securing in the closed state, have a securing installation. For example, the bell crank lever, in the closed state, can be locked with a split pin or a safety pin.

It can be provided according to an embodiment of the invention that the rotary coupling has an impact protection. This can be, for example, a cushion (configured as a plastics-material ring, for example) which in particular points in the radial direction and protects the rotary coupling from impacts in particular when being placed.

The nozzle installation has two annular regions or annular elements 1, 2, respectively, with the aid of which the nozzle installation is placed onto a shaft hub, or a spinner 3, respectively, of the fan of a jet engine (see FIG. 1). In the placed state, the annular elements 1, 2 enclose the spinner 3 in a substantially form-fitting manner. The internal diameter of the annular element 1 which, in axial terms, is disposed downstream is slightly larger than the external diameter of the spinner 3 in the axial plane in which the front edges of the fan blades 4 lie.

Rubber buffers 5 that are distributed across the circumference of the first annular element 1 form first contact faces by way of which the annular element 1 bears axially on the front edge of the fan blades 4.

Rubber buffers 6 that are distributed across the circumference of the second annular element 2 form second contact faces by way of which the annular element 2 bears on the spinner 3.

The two annular elements 1, 2 are connected to one another by radial stays 7. A rotary coupling which, in its entirety, is identified by the reference sign 8 and has an impact protection 9 as well as a connector piece 10 of a line connection is disposed on the tip of the nozzle installation that points upstream (in terms of the flow direction of the engine).

Four pressure lines 11, which feed a cleaning medium to four nozzles, extend from this rotary coupling. The pressure lines 11 are fixed to the annular elements 1, 2 at the intersection points with these annular elements and thus form part of the support structure of the entire nozzle installation.

Tensioning ropes 12 which, by means of hooks, can be hooked onto the rear edges of the fan blades 4 are provided for fastening the nozzle installation to the fan. Bell crank levers 13 which, in the locked position, can be fixed by means of a safety pin 14 are provided as individual fastening means for fixing the tensioning ropes 12. A spring 15 ensures defined tensioning of the tensioning ropes 12.

For cleaning the core engine, the nozzle installation, in the manner that can in particular be derived from FIG. 1, is placed onto the fan and fixed to the fan blades by means of the tensioning ropes 12. The engine is set in rotation (dry cranking). The nozzles are fed with a cleaning medium from a supply installation by way of the connection line 10, the rotary coupling 8, and the pressure lines 11. This cleaning medium sweeps the inlet of the core engine across the entire circumference of the latter and thus performs the cleaning.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for cleaning a core engine of a jet engine, the device comprising:
   a nozzle installation configured to introduce a cleaning medium into the core engine;
   a connector configured to connect the device in a rotationally fixed manner to a shaft of a fan of the jet engine; and
   a line connection configured to supply the cleaning medium, the line connection being connected to the nozzle installation by a rotary coupling,
   wherein the nozzle installation has first contact faces configured to bear axially on fan blades of the fan, the first contact faces being configured for defined positioning of the nozzle installation relative to the jet engine,
   wherein the connector comprises at least two tensioning ropes and fasteners configured to fasten the tensioning ropes to the fan blades, and
   wherein the fasteners are configured as individual fasteners that are separately lockable.

2. The device as claimed in claim 1, wherein the first contact faces are disposed on a first annular region of the nozzle installation.

3. The device as claimed in claim 1, wherein the nozzle installation comprises second contact faces for bearing on a spinner of the jet engine.

4. The device as claimed in claim 3, wherein the first contact faces are disposed on a first annular region of the nozzle installation, and wherein the second contact faces are disposed on a second annular region of the nozzle installation that in the axial direction is disposed between the first annular region and the rotary coupling.

5. The device as claimed in claim 4, wherein the first contact faces and the second contact faces are configured to center the device on the spinner of the jet engine.

6. The device as claimed in claim 5, wherein a distribution of mass of the nozzle installation is rotationally symmetrical about a rotation axis of the nozzle installation.

7. The device as claimed in claim 3, wherein the first contact faces or the second contact faces are elastic.

8. The device as claimed in claim 1, wherein the individual fasteners have bell crank levers.

9. The device as claimed in claim 1, wherein the individual fasteners have spring elements configured to set a defined preload of the tensioning ropes.

10. The device as claimed in claim 1, wherein individual fasteners are configured to be secured in a closed state and have a securing installation.

11. The device as claimed in claim 1, wherein the rotary coupling has an impact protection.

12. An assembly of the jet engine and the device as claimed in claim 1 attached thereto for performing cleaning of the core engine, wherein a. the nozzle installation is connected in the rotationally fixed manner to the shaft of the fan of the jet engine;
   b. rotation axes of the fan of the jet engine and of the nozzle installation are disposed so as to be substantially concentric;
   c. nozzles of the nozzle installation have a radial spacing from a common rotation axis of the jet engine and the device that is smaller than a radius of an entry opening of the core engine;
   d. exit openings of the nozzles in the axial direction are disposed behind the plane of the fan, or the nozzles are disposed in intermediate spaces of the fan blades, or aligned toward intermediate spaces of the fan blades such that nozzle jets can pass through a plane of the fan in a substantially unimpeded manner; and
   e. the first contact faces of the nozzle installation bear on the fan blades of the jet engine and cause defined axial positioning of the nozzle installation relative to the jet engine.

13. The assembly as claimed in claim 12, wherein the first contact faces are disposed on a first annular region of the nozzle installation, an internal diameter of the first annular region being identical to or slightly larger than the external diameter of the spinner.

14. The assembly as claimed in claim 12,
   wherein the nozzle installation additionally has second contact faces which are disposed on a second annular region of the nozzle installation that in the axial direction is disposed between the first annular region and the rotary coupling; and
   wherein the second contact faces bear on a spinner; and
   wherein the first contact faces and second the contact faces center the device on the spinner of the jet engine.

\* \* \* \* \*